(12) United States Patent
Chang et al.

(10) Patent No.: US 9,158,297 B2
(45) Date of Patent: Oct. 13, 2015

(54) COMPUTING DEVICE AND METHOD FOR GENERATING MEASUREMENT PROGRAM OF PRODUCT

(75) Inventors: Chih-Kuang Chang, New Taipei (TW);
Xin-Yuan Wu, Shenzhen (CN);
Jin-Gang Rao, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 603 days.

(21) Appl. No.: 13/552,655

(22) Filed: Jul. 19, 2012

(65) Prior Publication Data
US 2013/0110461 A1 May 2, 2013

(30) Foreign Application Priority Data
Oct. 28, 2011 (CN) .......................... 201110333576.6

(51) Int. Cl.
| G01B 11/24 | (2006.01) |
| G06F 15/00 | (2006.01) |
| G05B 19/401 | (2006.01) |
| G06T 17/00 | (2006.01) |

(52) U.S. Cl.
CPC .............. *G05B 19/401* (2013.01); *G06T 17/00* (2013.01); *G06T 2210/32* (2013.01)

(58) Field of Classification Search
CPC ... G05B 19/401; G06T 17/00; G06T 2210/32
USPC ........... 702/167, 155; 382/145, 152; 345/420, 345/427; 715/700
See application file for complete search history.

(56) References Cited

U.S. PATENT DOCUMENTS

| 7,002,573 | B2 * | 2/2006 | Trotta et al. ................... 345/420 |
| 7,324,682 | B2 * | 1/2008 | Wasserman ................... 382/145 |
| 7,714,860 | B2 * | 5/2010 | Trotta et al. ................... 345/427 |
| 2004/0140991 | A1 * | 7/2004 | Trotta et al. ................... 345/700 |
| 2005/0213807 | A1 * | 9/2005 | Wasserman ................... 382/152 |
| 2010/0149180 | A1 * | 6/2010 | Trotta et al. ................... 345/420 |

* cited by examiner

*Primary Examiner* — Carlos S Tsai
(74) *Attorney, Agent, or Firm* — Novak Druce Connolly Bove + Quigg LLP

(57) ABSTRACT

In a method for generating a measurement program of a product, a CAD file of the product is read and attribute data of the product is obtained from the CAD file. By creating a mesh over the attribute data of the product using a plurality of triangles, the method obtains coordinate information of measuring points of the product from the CAD file, arranges the measuring points of the product into one or more geometrical elements using a curve fitting method, and obtains measuring information of each geometrical element. By integrating the measuring information of each of the one or more geometrical elements into a predefined program model, a measurement program can be generated and displayed on a display device.

12 Claims, 6 Drawing Sheets

COMPUTING DEVICE AND METHOD FOR GENERATING MEASUREMENT PROGRAM OF PRODUCT

BACKGROUND

1. Technical Field

Embodiments of the present disclosure generally relate to measurement programs, and more particularly to a computing device for generating a measurement program of a product, and a method for generating a measurement program of a product using the computing device.

2. Description of Related Art

Image measurement machines (IMMs) are widely used in industry to measure manufactured parts. Measurements of an image of a manufactured part can determine if the manufactured part meets design specifications, so as to provide information for improvements in process control. Editing of measurement programs of IMMs can be a bottleneck in the manufacturing process. In order to edit a measurement program, a measuring process of the IMM needs to be recorded, and a designer needs to edit the measurement program according to the measuring process. To edit the measurement program, the designer must be experienced in editing measurement programs, and must do the editing and programming with design drawings of the manufactured part at hand. In the design drawings, an overlap of two feature elements may be shown. In such case, the overlap may contribute to the designer confusing the two feature elements; and when this happens, the editing and programming may be erroneous. Therefore, an improved system and method addressing the aforementioned issues are desired.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an erasable-programmable read-only memory (EPROM). It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device.

Figure 1:
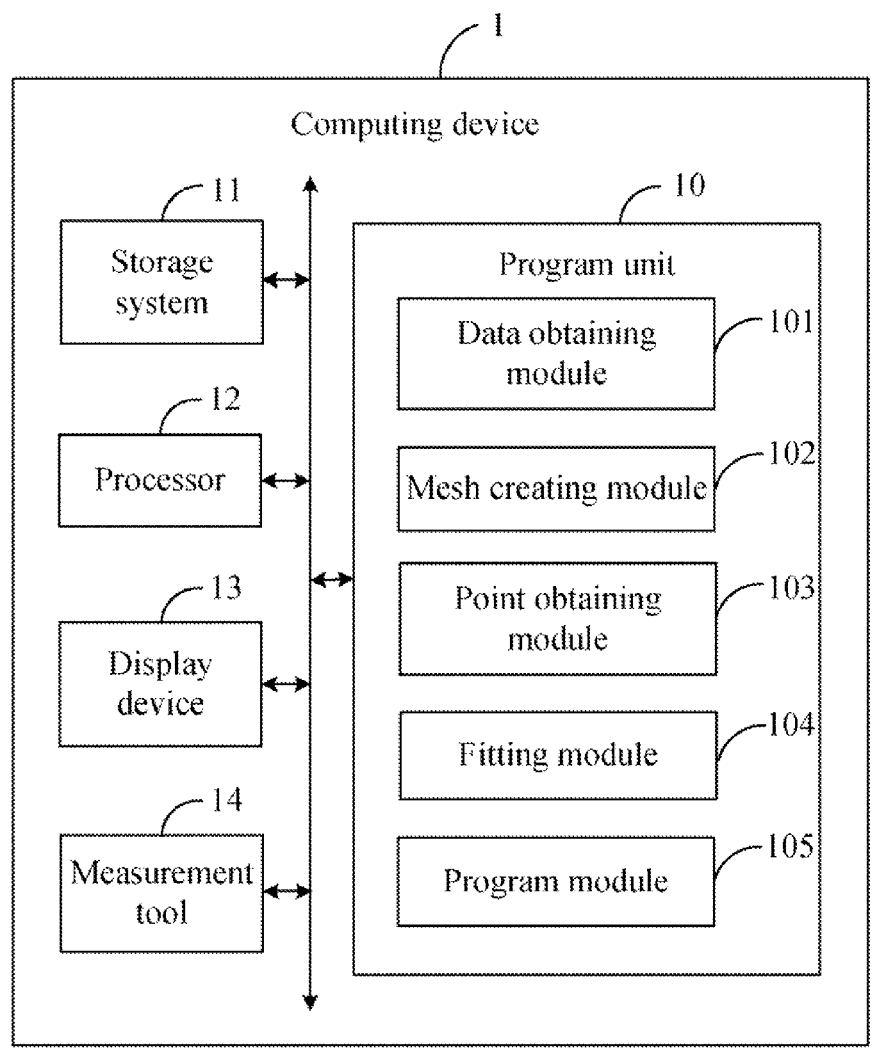
FIG. 1 is a block diagram of one embodiment of a computing device including a program unit.

FIG. 1 is a block diagram of one embodiment of a computing device 1 including a program unit 10. The computing device 1 further includes a storage system 11, at least one processor 12, a display device 13, and a measurement tool 14. In one embodiment, the computing device 1 may be a computer, a server, a portable electronic device, or any other data processing device. In the illustrated embodiment, there is a single processor 12. Functions of the program unit 10 are implemented by the computing device 1. The program unit 10 may be a software program stored in the storage system 11 and executed by the processor 12.

In one embodiment, the storage system 11 may be a magnetic or an optical storage system, such as a hard disk drive, an optical disk drive, a compact disc, a digital video disc, a tape drive, or other suitable storage medium. The processor 12 may be a central processing unit including a math co-processor, for example.

In one embodiment, the program unit 10 includes a data obtaining module 101, a mesh creating module 102, a point obtaining module 103, a fitting module 104, and a program module 105. Each of the modules 101-105 may be a software program including one or more computerized instructions that are stored in the storage system 11 and executed by the processor 12.

The data obtaining module 101 reads a computer aided design (CAD) file of a product from the storage system 11, analyzes the CAD file, and obtains attribute data for describing the product from the CAD file. In one embodiment, the CAD file may be an initial graphics exchange specification (IGES) file, or a standard for the exchange of product model data (STEP) file.

In the embodiment, the attribute data may include a stream of coordinate values and a matrix of the coordinate values of a point, a line, a curve, a plane, and a sphere, allowing the eventual creation of a 3D model of the product.

The mesh creating module 102 creates a mesh over the attribute data of the product described in the CAD file using a plurality of triangles, to obtain a 3D model of the product. Details of creating a mesh over the attribute data of the product and obtaining the 3D model are described below in relation to FIG. 3.

The point obtaining module 103 uses the measurement tool 14 to select a number of points from the 3D model. The points are measuring points of the product. The point obtaining module 103 obtains coordinate information of the measuring points from the CAD file. The coordinate information includes a coordinate value and a direction vector of each of the measuring points.

In the embodiment, the measurement tool 14 is provided by CAD software or computer aided manufacturing (CAM) software that is installed in the computing device 1. The measurement tool 14 itself has different types of selectable tools, such as a point searching tool, a line searching tool, an arc searching tool, a surface focusing tool, and a contour focusing tool, for example. When a user of the computing device 1 selects one type of measurement tool 14 and clicks a point on the 3D model of the product using a mouse of the computing device 1, the point obtaining module 103 can import a measuring point from the 3D model.

The fitting module 104 arranges the measuring points of the product into one or more geometrical elements using a curve fitting method, and obtains measuring information of each of the geometrical elements according to the coordinate information. The curve fitting method is a process of constructing a curve, or constructing a mathematical function of the measuring points. Each of the geometrical elements corresponds to a plurality of items of measuring information. In theory, one product matches one geometrical element. When the number of measuring points is small, the fitting module 104 can fit the measuring points into several geometrical elements.

In one embodiment, each of the geometrical elements can be a point, a line, a circle, a flat surface, a plane, a circle, a cylinder, and the like. For example, if the imported measuring points are three points on the same plane, the fitting module 104 can determine that the three points may fit into or onto a flat surface, a plane or a circle.

In the embodiment, the measuring information of each of the geometrical elements is information concerning the construction and form of each of the geometrical elements, such as dimensional data and relationships within each geometrical element. For example, if the geometrical element is a straight line, the measuring information includes the starting point and the end point of the straight line. If the geometrical element is a circle, the measuring information includes the midpoint of the circle, and the radius of the circle.

The program module 105 generates a measurement program by inputting the measuring information of each of the one or more geometrical elements into a predefined program model. In the embodiment, the predefined program model is a sample of the measurement program.

The program module 105 further displays the measurement program on the display device 13.

Figure 2:
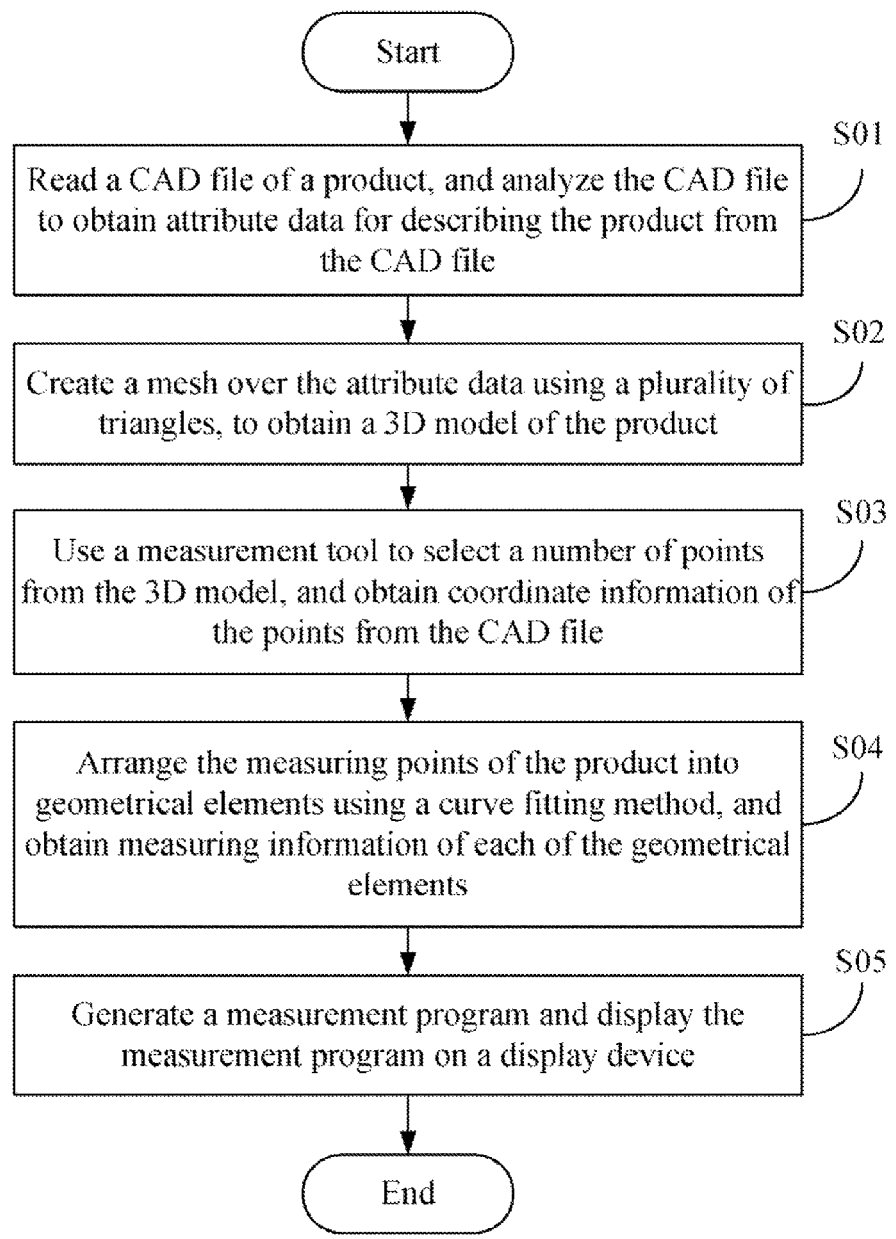
FIG. 2 is a flowchart illustrating one embodiment of a method for generating a measurement program of a product using the computing device of FIG. 1.

FIG. 2 is a flowchart illustrating one embodiment of a method for generating a measurement program of a product using the computing device 1. Depending on the embodiment, additional blocks may be added, others removed, and the ordering of the blocks may be changed.

In step S01, the data obtaining module 101 reads a CAD file of the product from the storage system 11, and analyzes the CAD file to obtain attribute data for describing the product from the CAD file. In one embodiment, the CAD file may be an IGES file, or a STEP file.

In step S02, the mesh creating module 102 creates a mesh over the attribute data of the product using a plurality of triangles, to obtain a 3D model of the product. Details of step S02 are described below in relation to FIG. 3.

In step S03, the point obtaining module 103 uses the measurement tool 14 to select a number of points from the 3D model, and obtains coordinate information of the points from the CAD file. In the embodiment, the selected points are measuring points of the product. The coordinate information of each measuring point includes a coordinate value and a direction vector of each of the measuring points.

In the embodiment, the measurement tool 14 itself has different types of tools, such as a point searching tool, a line searching tool, an arc searching tool, a surface focusing tool, and a contour focusing tool, for example.

In step S04, the fitting module 104 arranges the measuring points of the product into one or more geometrical elements using a curve fitting method, and obtains measuring information of each of the geometrical elements according to the coordinate information. The curve fitting method is the process of constructing a curve, or constructing a mathematical function of the measuring points. Each of the geometrical elements corresponds to a plurality of items of measuring information.

In the embodiment, the measuring information of each geometrical element is information concerning the construction and form of each geometrical element, such as dimensional data and relationships within the geometrical element.

In step S05, the program module 105 generates a measurement program by integrating the measuring information of each of the one or more geometrical elements into a predefined program model, and displays the measurement program on the display device 13. In the embodiment, the predefined program model is a sample of the measurement program.

Figure 3:
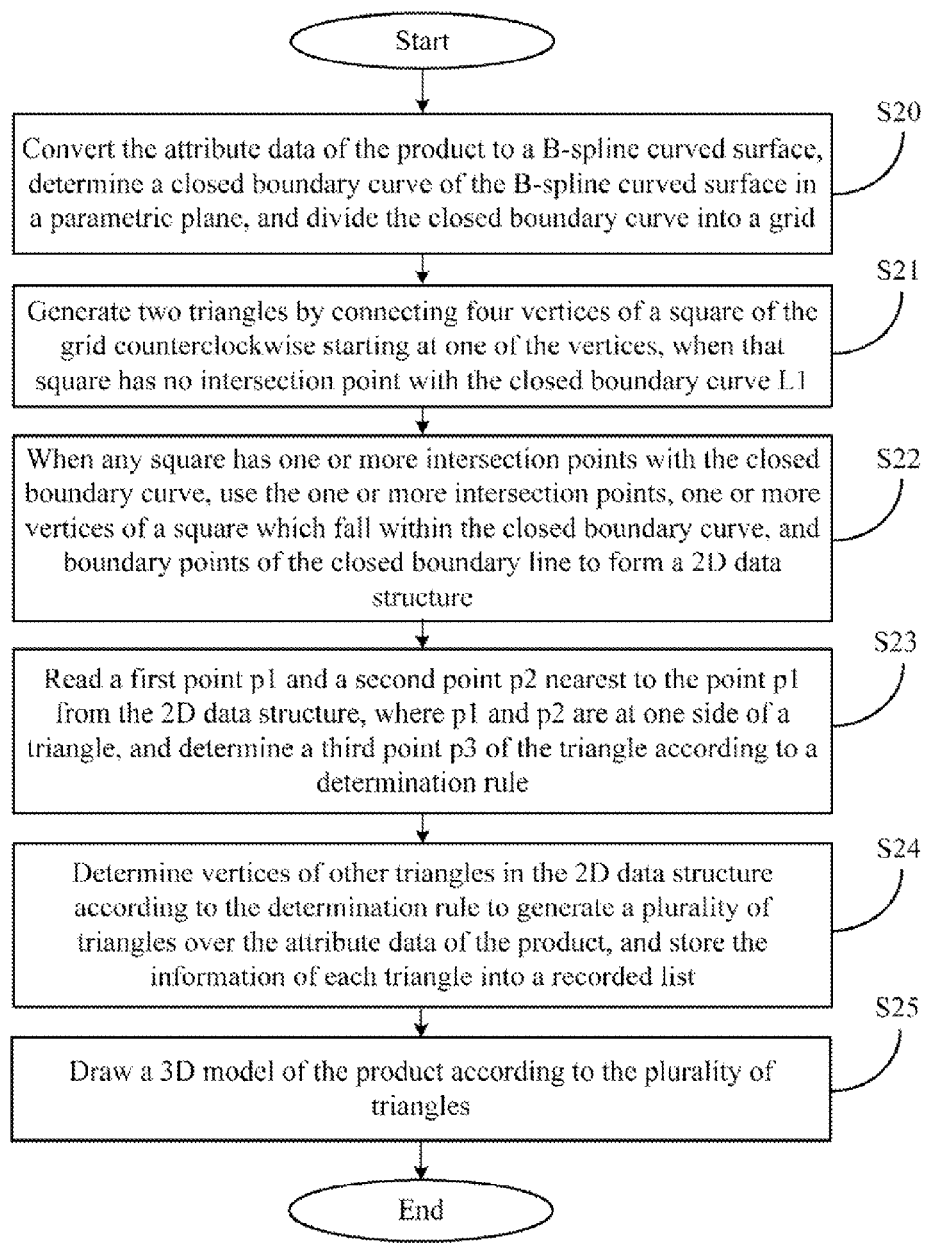
FIG. 3 is a detailed flowchart of one step of FIG. 2, namely creating a mesh over attribute data of the product with a plurality of triangles, to obtain a three-dimensional (3D) model of the product.

FIG. 3 is a detailed flowchart of step 02 of FIG. 2, namely creating a mesh over the attribute data of the product with a plurality of triangles. Depending on the embodiment, additional blocks may be added, others removed, and the ordering of the blocks may be changed.

Figure 4:
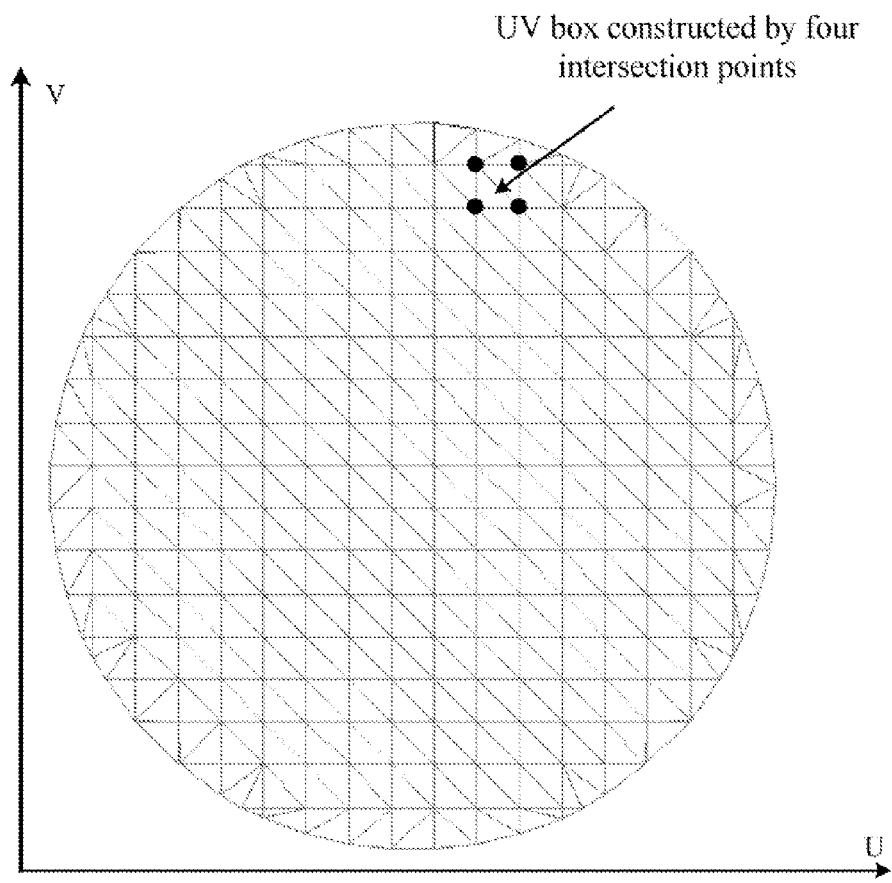
FIG. 4 and FIG. 5 are schematic diagrams illustrating aspects of one example of carrying out the steps of FIG. 3.

In step S20, the mesh creating module 102 converts the attribute data of the product described in the CAD file to a B-spline curved surface, and determines a closed boundary curve L1 of the B-spline curved surface in a parametric plane. The mesh creating module 102 further divides the closed boundary curve L1 into a grid (as shown in FIG. 4) using a plurality of horizontal lines (known as "U-lines") and vertical lines (known as "V-lines"). In the embodiment, the grid is constructed by a plurality of squares, namely "UV" boxes.

Figure 5:
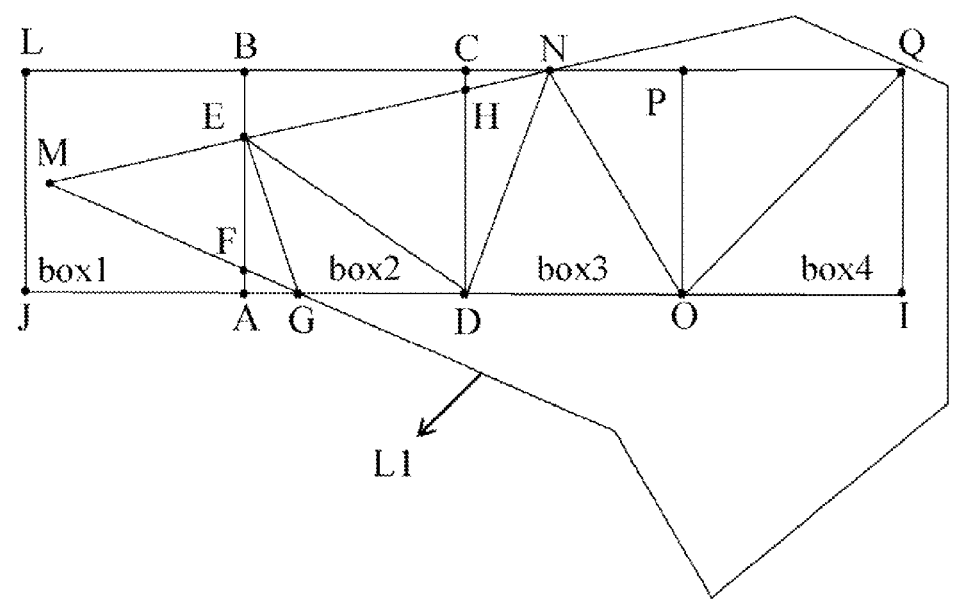

In step S21, when any square has no intersection point with the closed boundary curve L1, the mesh creating module 102 generates two triangles by connecting four vertices of a square of the grid counterclockwise starting at one of the vertices. For example, as shown in FIG. 5, four vertices "P," "Q," "I," and "O" of a square "box4" all fall within the closed boundary curve L1, and then the mesh creating module 102 generates two triangles "OQP" and "OIQ" by connecting the four vertices "P," "Q," "I," and "O" counterclockwise.

In step S22, when any square has one or more intersection points with the closed boundary curve L1, the mesh creating module 102 uses the one or more intersection points, one or more vertices of the square which fall within the closed boundary curve L1, and one or more boundary points of the closed boundary curve L1 to form a two-dimensional (2D) data structure. For example, as shown in FIG. 5, a square "box1" is in contact with the closed boundary curve L1. The square "box1" has two intersection points "E" and "F" with the closed boundary curve L1. A boundary point "M" of the closed boundary curve L1 falls within the square "box1." A square "box2" is in contact with the closed boundary curve L1. The square "box2" has four intersection points "E," "F," "H," and "G" with the closed boundary curve L1, and the vertex "D" of the square "box 2" falls within the closed boundary curve L1. Then, the mesh creating module 102 uses the points "M," "E," "F," "H," "D," and "G" to form the 2D data structure.

In step S23, the mesh creating module 102 reads a first point p1 and a second point p2 nearest to the point p1 from the 2D data structure, where point p1 and point p2 are at one side of a triangle. The mesh creating module 102 further determines a third point p3 of the triangle according to a proviso (determination rule) that there is no 2D point of the 2D data structure in a circumcircle of the triangle which consists of the points p1, p2, and p3.

In step S24, the mesh creating module 102 determines vertices of other triangles in the 2D data structure according to the determination rule, to generate the plurality of triangles over the attribute data of the product, and stores the information of each triangle into a recorded list according to the sequence in which the triangles are generated.

Figure 6:
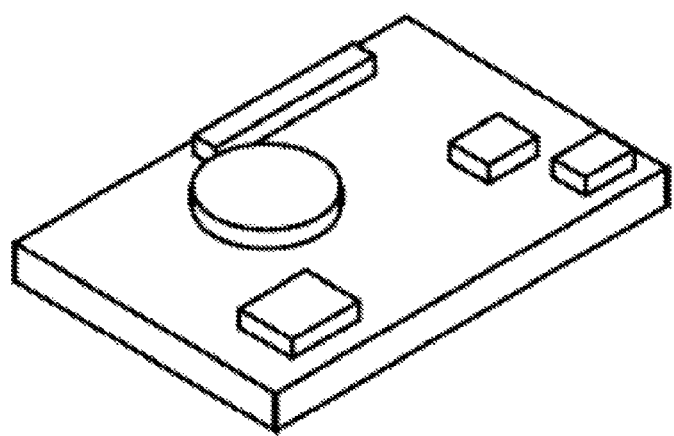
FIG. 6 is a view of an exemplary 3D model of the product obtained by carrying out the steps of FIG. 3.

In step S25, the mesh creating module 102 draws a 3D model of the product according to the plurality of triangles and the information of each triangle. In FIG. 6, an example of a 3D model of the product is shown, and the 3D model can be displayed on the display screen 13.

Although certain embodiments have been specifically described above, the present disclosure is not to be construed as being limited thereto. Various changes or modifications may be made to the present embodiments without departing from the scope and spirit of the present disclosure.

What is claimed is:

1. A computer-implemented method for generating a measurement program of a product using a computing device, the method comprising:

reading a computer aided design (CAD) file of the product, and obtaining attribute data for describing the product from the CAD file;

creating a mesh over the attribute data of the product using a plurality of triangles, wherein the mesh is created by performing operations comprising: converting the attribute data of the product to a B-spline curved surface, determining a closed boundary curve of the B-spline curved surface in a parametric plane and dividing the closed boundary curve into a grid using a plurality of horizontal lines and vertical lines; generating two triangles by connecting four vertices of the square counterclockwise when one square of the grid has no intersection point with the closed boundary curve; forming a two-dimensional (2D) data structure according to the one or more intersection points, one or more vertices of the square which fall within the closed boundary curve and boundary points of the closed boundary curve when one square of the grid has one or more intersection points with the closed boundary curve; reading a first point and a second point nearest to the first point from the 2D data structure, constructing one side of a triangle using the first point and the second point, and determining a third point of the triangle according to a determination rule, wherein the determination rule requires that there is no 2D point of the 2D data structure in a circumcircle of the triangle; determining vertices of other triangles in the 2D data structure according to the determination rule, to generate the plurality of triangles over the attribute data of the product; and drawing a three-dimensional (3D) model of the product according to the plurality of triangles;

obtaining coordinate information of measuring points of the product from the CAD file using a measurement tool, the coordinate information comprising a coordinate value and a direction vector of each of the measuring points;

arranging the measuring points of the product into one or more geometrical elements, and obtaining measuring information of each of the one or more geometrical elements according to the coordinate information;

generating a measurement program by integrating the measuring information of each of the one or more geometrical elements into a predefined program model; and displaying the measurement program on a display device of the computing device.

2. The method as described in claim 1, wherein the attribute data comprises a stream of coordinate values and a matrix of the coordinate values of a point, a line, a curve, a plane, and a sphere allowing the creation of the 3D model of the product.

3. The method as described in claim 1, wherein the measurement tool comprises different type of selectable tools selected from the group consisting of a point searching tool, a line searching tool, an arc searching tool, a surface focusing tool, and a contour focusing tool.

4. The method as described in claim 1, wherein the CAD file is one of an initial graphics exchange specification file and a standard file for the exchange of product model data.

5. A computing device, comprising:
at least one processor;
a storage system;
a display device; and
one or more modules that are stored in the storage system and executed by the at least one processor, the one or more modules comprising:

a data obtaining module that reads a computer aided design (CAD) file of a product, and obtains attribute data for describing the product from the CAD file;

a mesh creating module that creates a mesh over the attribute data of the product using a plurality of triangles, wherein the mesh is created by performing operations comprising: converting the attribute data of the product to a B-spline curved surface, determining a closed boundary curve of the B-spline curved surface in a parametric plane, and dividing the closed boundary curve into a grid using a plurality of horizontal lines and vertical lines; generating two triangles by connecting four vertices of the square counterclockwise when one square of the grid has no intersection point with the closed boundary curve; forming a two-dimensional (2D) data structure according to the one or more intersection points, one or more vertices of the square which fall within the closed boundary curve and boundary points of the closed boundary curve when one square of the grid has one or more intersection points with the closed boundary curve; reading a first point and a second point nearest to the first point from the 2D data structure, constructing one side of a triangle using the first point and the second point, and determining a third point of the triangle according to a determination rule, wherein the determination rule requires that there is no 2D point of the 2D data structure in a circumcircle of the triangle; determining vertices of other triangles in the 2D data structure according to the determination rule, to generate the plurality of triangles over the attribute data of the product; and drawing a three-dimensional (3D) model of the product according to the plurality of triangles;

a point obtaining module that obtains coordinate information of measuring points of the product from the CAD file using a measurement tool, the coordinate information comprising a coordinate value and a direction vector of each of the measuring points;

a fitting module that arranges the measuring points of the product into one or more geometrical elements, and obtains measuring information of each of the one or more geometrical elements according to the coordinate information; and a program module that generates a measurement program by integrating the measuring information of each of the one or more geometrical elements into a predefined program model, and displays the measurement program on the display device.

6. The computing device as described in claim 5, wherein the attribute data comprises a stream of coordinate values and a matrix of the coordinate values of a point, a line, a curve, a plane, and a sphere allowing the creation of the 3D model of the product.

7. The computing device as described in claim 5, wherein the measurement tool comprises different types of selectable tools selected from the group consisting of a point searching tool, a line searching tool, an arc searching tool, a surface focusing tool, and a contour focusing tool.

8. The computing device as described in claim 5, wherein the CAD file is one of an initial graphics exchange specification file and a standard file for the exchange of product model data.

9. A non-transitory computer readable storage medium having stored thereon instructions that, when executed by a processor of a computing device, cause the computing device to perform a method for generating a measurement program of a product, the method comprising:

reading a computer aided design (CAD) file of the product, and obtaining attribute data for describing the product from the CAD file;

creating a mesh over the attribute data of the product using a plurality of triangles, wherein the mesh is created by performing operations comprising: converting the attribute data of the product to a B-spline curved surface, determining a closed boundary curve of the B-spline curved surface in a parametric plane and dividing the closed boundary curve into a grid using a plurality of horizontal lines and vertical lines; generating two triangles by connecting four vertices of the square counterclockwise when one square of the grid has no intersection point with the closed boundary curve; forming a two-dimensional (2D) data structure according to the one or more intersection points, one or more vertices of the square which fall within the closed boundary curve and boundary points of the closed boundary curve when one square of the grid has one or more intersection points with the closed boundary curve; reading a first point and a second point nearest to the first point from the 2D data structure, constructing one side of a triangle using the first point and the second point, and determining a third point of the triangle according to a determination rule, wherein the determination rule requires that there is no 2D point of the 2D data structure in a circumcircle of the triangle; determining vertices of other triangles in the 2D data structure according to the determination rule, to generate the plurality of triangles over the attribute data of the product; and drawing a three-dimensional (3D) model of the product according to the plurality of triangles;

obtaining coordinate information of measuring points of the product from the CAD file using a measurement tool, the coordinate information comprising a coordinate value and a direction vector of each of the measuring points;

arranging the measuring points of the product into one or more geometrical elements, and obtaining measuring information of each of the one or more geometrical elements according to the coordinate information;

generating a measurement program by integrating the measuring information of each of the one or more geometrical elements into a predefined program model; and displaying the measurement program on a display device of the computing device.

10. The storage medium as described in claim 9, wherein the attribute data comprises a stream of coordinate values and a matrix of the coordinate values of a point, a line, a curve, a plane, and a sphere allowing the creation of the 3D model of the product.

11. The storage medium as described in claim 9, wherein the measurement tool comprises different types of selectable tools selected from the group consisting of a point searching tool, a line searching tool, an arc searching tool, a surface focusing tool, and a contour focusing tool.

12. The storage medium as described in claim 9, wherein the CAD file is one of an initial graphics exchange specification file and a standard file for the exchange of product model data.

* * * * *